Figure 1:
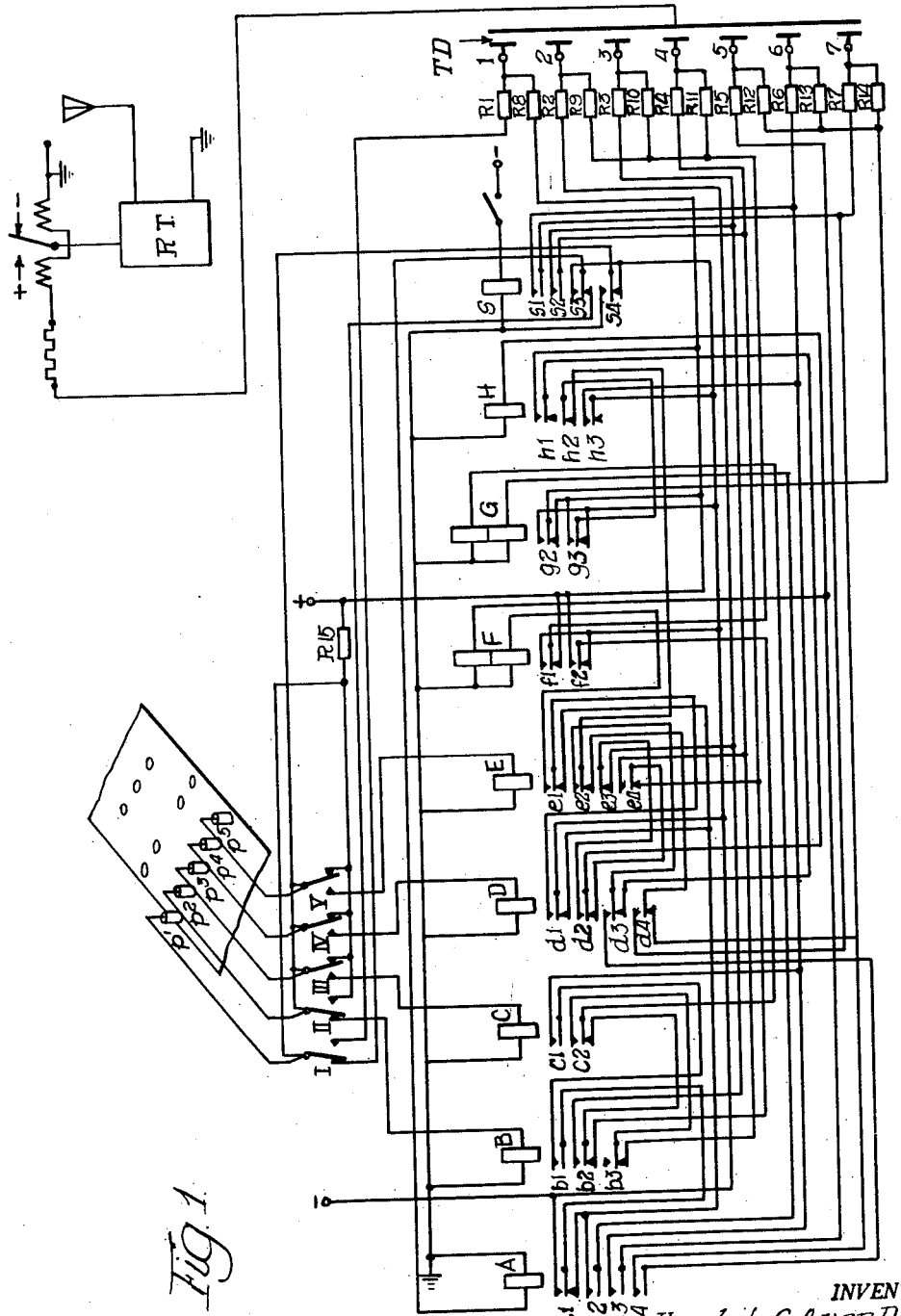

FIG.2

| | 5-bit code | 7-bit code |
|---|---|---|
| a | ● ● ○ ○ ○ | ● ● ○ ○ ○ ○ ● |
| b | ● ○ ○ ● ● | ● ● ● ○ ○ ○ ○ |
| c | ○ ● ● ● ○ | ○ ○ ● ● ○ ● ○ |
| d | ● ○ ○ ● ○ | ● ○ ○ ● ● ○ ○ |
| e | ● ○ ○ ○ ○ | ● ○ ○ ● ○ ○ ● |
| f | ● ○ ● ● ○ | ● ○ ○ ○ ● ○ ○ |
| g | ○ ● ○ ● ● | ○ ○ ● ● ○ ○ ● |
| h | ○ ○ ● ○ ● | ○ ○ ● ○ ● ○ ● |
| i | ○ ● ● ○ ○ | ○ ● ● ○ ○ ● ○ |
| j | ● ● ○ ● ○ | ● ● ○ ○ ● ○ ○ |
| k | ● ● ● ● ○ | ● ○ ○ ○ ● ● ● |
| l | ○ ● ○ ○ ● | ○ ● ○ ○ ● ○ ● |
| m | ○ ○ ● ● ● | ○ ● ○ ● ○ ○ ● |
| n | ○ ○ ● ● ○ | ○ ○ ● ○ ○ ● ● |
| o | ○ ○ ○ ● ● | ○ ● ● ○ ○ ○ ● |
| p | ○ ● ● ○ ● | ○ ● ○ ● ○ ● ○ |
| q | ● ● ● ○ ● | ● ○ ○ ○ ● ○ ● |
| r | ○ ● ○ ● ○ | ○ ● ○ ○ ○ ● ● |
| s | ● ○ ● ○ ○ | ● ○ ● ○ ○ ○ ● |
| t | ○ ○ ○ ○ ● | ○ ○ ○ ● ● ○ ● |
| u | ● ● ● ○ ○ | ● ○ ○ ○ ● ● ○ |
| v | ○ ● ● ● ● | ○ ○ ○ ● ● ● ○ |
| w | ● ● ○ ○ ● | ● ● ○ ○ ○ ● ○ |
| x | ● ○ ● ● ● | ● ● ○ ● ○ ○ ○ |
| y | ● ○ ● ○ ● | ● ○ ● ● ○ ● ○ |
| z | ● ○ ○ ○ ● | ● ○ ○ ● ○ ○ ● |
| CARRIAGE RETURN | ○ ○ ○ ● ○ | ○ ○ ○ ● ○ ● ● |
| LINE FEED | ○ ● ○ ○ ○ | ○ ● ○ ○ ● ● ○ |
| FIGURES | ● ● ○ ● ● | ● ○ ● ● ○ ○ ○ |
| LETTERS | ● ● ● ● ● | ○ ● ● ○ ○ ○ ○ |
| SPACE | ○ ○ ● ○ ○ | ○ ○ ● ○ ● ● ○ |
| — | ○ ○ ○ ○ ○ | ○ ○ ○ ● ● ● ○ |

WARNING SIGNAL ○ ○ ● ● ● ○ ○

Inventor
Hendrik C. A. van Duuren
By Brown, Jackson, Boettcher & Dienner
Att'ys

July 15, 1952  H. C. A. VAN DUUREN  2,603,705
CODE CONVERTER

Filed June 14, 1946  3 Sheets-Sheet 3

INVENTOR.
Hendrik C. A. van Duuren,
BY Brown, Jackson,
Boettcher & Dienner

Patented July 15, 1952

2,603,705

UNITED STATES PATENT OFFICE 2,603,705

CODE CONVERTER

Hendrik C. A. van Duuren, Wassenaar, Netherlands, assignor to Staatsbedrijf Der Posterijen, Telegrafie En Telefonie, The Hague, Netherlands Application June 14, 1946, Serial No. 676,841
In the Netherlands November 19, 1941

Section 1, Public Law 690, August 8, 1946
Patent expires November 19, 1961

5 Claims. (Cl. 178—2)

The present invention provides a code-converter for converting signal combinations of a five unit code into signals having a constant ratio of marking and spacing elements of a seven unit code and conversely. Systems of these nature are applicable in particular to coupling telegraph subscriber's lines operated on five unit code with the radio transmitter and receiver used for transmitting signals having a constant ratio of marking and spacing elements of a seven unit code. The importance of transmitting signals in this way over the radio path is the possibility thus introduced of protecting the transmitted signals from disturbances which may occur on the radio path; systems presenting this feature are described in the French patent specification No. 851,674, British patent specification No. 514,588 and United States patent specification No. 2,183,147. As per the above French patent specification, telegraph signals are transmitted as combinations of an eight unit code, each combination comprising four marking units and four spacing units; the transmitter and the receiver must then be provided with means for converting signals from the five unit code to the eight unit code and conversely. In the circuit arrangement showing this feature in the above patent specifications an eight unit signal was formed from a five unit signal by the addition of three elements to each signal of the five unit code (with the exception only of the two signals comprising five identical elements), so that an eight unit signal comprising four marking elements and four spacing elements is obtained. The procedure outlined comprises three stages, one unit being added at each stage successively and the incomplete signal being tested for its ratio of marking and spacing elements each time before this addition. The conversion of five unit signals into signals having a constant ratio of marking and spacing elements of the seven unit code must follow a different procedure, as in many cases the elements of the five unit signals cannot correspond to the first five elements of the seven unit signals to be formed. Contrary to the converter known from the above French patent specification, the converter as per the present invention provides a static converter, i. e. as soon as a five unit signal is applied to the input, the corresponding seven unit signal is obtained at the output. The advantages of such a converter as to improved working speed, as compared with the converter of the eight unit system referred to, will be understood without further comments. Static converters are already known for other conversions, as for example in British Patent No. 512,827 in which the conversion of a five unit code into an alphabetical code is described.

The conception of the circuit arrangement for converting five unit signals into seven unit signals is based on the following idea: the five unit signal is subdivided into two groups of two elements, so that one separate element is left. In each group of two elements one of the following four combinations may occur: 0x, x0, 00 or xx. These combinations may be registered in a group of three relays by energizing the first, the second, the third or none of these three relays. The non-operation of the first, second or third relay or the operation of all three relays are to be considered as equivalents to the states mentioned before, as will appear below. Of course relays as such are not necessary, the general idea of the above being understandable with reference to the voltages only as applied to three conductors.

In the manner outlined the two two unit groups of the five unit signal determine the voltages for the six conductors of the seven unit system. The voltage of the seventh conductor is directly taken from the polarity of the fifth unit. It appears to be possible in all cases except one (namely when the five unit signal consists of five marking units), to choose the voltage of this seventh unit of identical sign as that of the fifth unit; for the number of marking units of the seven unit signal should be the same for all signals. If this number is assumed to be three, it will be clear that a five unit signal comprising five marking elements cannot be converted in the stated manner into a seven unit signal of which the separate element is a marking element, because the seven unit signal would then have more than the fixed number of three marking elements per signal. For in the system so far described, it may occur that these groups in the five unit signal contain exclusively marking units so that the first group of three conductors would receive marking voltage and the second group spacing voltage, or conversely, in which case the seventh unit must be a spacing unit, in order not to exceed the predetermined fixed value of three marking elements in each seven unit signal. Accordingly, the circuit 5—7 is such that an inversion of the polarity of the separate fifth unit is produced, whenever the four remaining units are all marking units. In the seven unit signals commencing with a spacing element and none of the groups of the corresponding five unit signal having a group containing two marking elements (so all five unit signals beginning with a spacing element and not having a group of only marking elements) the three marking units must be obtained from the groups of three elements, which, as stated above, are originated by both two-unit groups of the five unit signal. Consequently, one of these three unit groups must be formed as per the principle announced in column 2, lines 6–10 (two or three spacing elements being left in the group) and the other three unit group according to the principle mentioned as an equivalent in the same column (two or three marking elements being left in the group). The same applies to the place of the three marking units in the seven unit signal corresponding to the five marking units signal and of which the separate unit is a spacing element. The three unit groups comprising identical units only correspond to two unit groups containing two marking or working units. The signals in which such three unit groups occur are only two in number, viz. 0000xxx and 0xxx000, correspoding to 0xxxx (letter V) and xxxxx (letters) in the five unit system.

The seven unit signals containing groups consisting respectively of two marking units or of two spacing units (and which commence with a separate spacing element), may be built up from the following scheme:

```
0 x00 xx0
0x0 x0x
00x 0xx
``` namely by permutating the groups of three shown in the two columns. Thus nine variations are formed.

If a five unit signal commencing with a space has a group of two marking units (in the five unit system), the corresponding three element group may only have either three spacing elements or three marking elements. Should the signals stated above in particular not be taken into consideration, the provision of the seven unit signal comprising three marking elements is rendered impossible. The invention provides for this difficulty by introducing in the three element group corresponding to the two marking elements group a characteristic combination (K combination) having a single marking element. In the circuit arrangement concerned it has appeared to be necessary to use two different K-combinations and to put eventually always the same K-combinations in the same place in the seven unit signal, the nature of the K-combination indicating whether the left hand or the right hand group of the five unit signal consists of two marking elements. The other three unit group indicates the nature of the other two element group and therefore corresponds in half the number of cases not to the left hand, but to the right hand group and conversely. If the K-combinations have a single marking element (which is the case in the embodiment to be given below) the number of marking units in the other group of three must again be two.

K-combinations will not occur in seven unit signals beginning with a marking unit. It will be sufficient in order to form these signals with three marking units to choose both three unit groups with one marking element each, whereby nine combinations will again be obtained by permutating:

```
x x00 x00
0x0 0x0
00x 00x
```

In case one of the groups of two units of the five unit signals starting with a marking unit consists of marking units exclusively the corresponding three group will have three spaces. The other three group must then be operated with two marks (i. e. with the "equivalent" mentioned in column 2, in order that together with the mark initiating the signal three marks will be obtained). In this manner six more signals will be formed. Together with the nine signals mentioned in the preceding paragraph (15), the nine signals mentioned in column 3, line 34 and the six having K-combinations (30) and finally with the two particular signals mentioned initially, the 32 signals required are formed. As the seven unit system for which $m=3$ and $n=4$ will provide $35mn$ variations, three of which remain for signalling purposes.

The invention will now be described with reference to the annexed drawing, in which, as a constructional example Fig. 1 shows a five-seven converter, Fig. 2 corresponding five and seven unit codes, and Fig. 3 a seven-five converter.

Referring first to Figure 1, the conventional perforated paper tape of a Baudot five-unit code transmitter is diagrammatically indicated at T. This paper tape has perforations $p$ arranged in different code relations in five different lines or columns in the tape, as is well known. Five feeling tongues or contact members $p^1$, $p^2$, $p^3$, $p^4$ and $p^5$ are arranged to coact with these five lines of perforations $p$. These feeling tongues either constitute contacting members I, II, III, IV and V, or are arranged to actuate such contacting members. When the feeling tongues $p^1$—$p^5$ are in their normal positions bearing on unperforated portions of the tape, their corresponding contact members I—V are in engagement with their right hand contacts, corresponding to spacing units in the five-unit code. When the feeling tongues are engaging in perforations $p$, their corresponding contact members I—V are in engagement with their left hand contacts, corresponding to marking units in the five unit code. In the code chart of Figure 2, the marking units or elements are designated by dots, and the spacing units or elements by zeros or circles. In the preceding general statement of this text x's were used instead of dots. The first contact finger I is connected to positive polarity through resistor R15, and the other contact fingers II, III, IV and V are adapted to be connected to negative polarity through the armature S4 of relay S. The left hand contact of finger I is connected to output conductor 1 and the right hand contact of finger I is adapted to be connected through relay armature S3 with the winding of relay A. The left hand contacts of the other four contact fingers II, III, IV and V are connected respectively with the windings of relays B, C, D and E. The right-hand contacts of contact fingers II, III, IV and V have common connection with a junction point of the conductor leading from resistor R15 to contact finger I, whereby said right hand contacts are operative to place negative polarity on said contact finger I in response to right hand or spacing movement of either one of the contact fingers II, III, IV and V.

The output terminals 1, 2, 3, 4, 5, 6, 7 transmit their voltages to any suitable transmitting distributor or the like for transmission in proper time sequence to a radio transmitter in a manner well known to those skilled in the art, and as exemplified in my prior United States Patent No. 2,279,353.

Auxiliary relays F, G and H respond to the positions of the armature contacts of the main relays A, B, C, D and E, as shown by the circuit connections between these relays in Figure 1. Other armature contacts of the main relays A, B, C, D and E cooperate with armature contacts of the auxiliary relays F, G and H to control the energization of the last six output terminals 2, 3, 4, 5, 6 and 7, as clearly illustrated in the drawing. Resistors R1 to R7, inclusive, are interposed in series in the output conductors 1 to 7, inclusive. Resistors R9 to R11 are connected between relay armature $f_1$ and output conductors 2, 3 and 4; and resistors R12 to R14 are connected between relay armature $g_2$ and output conductors 5, 6 and 7. The values of resistances R1 to R15 are suitably chosen so as to obtain the effects desired, as will be obvious to those skilled in the art.

Signalling relay S has its winding connected between ground and a terminal to which voltage is applied when a signal is to be sent. This signalling relay S controls armature contacts S1, S2, S3 and S4.

Referring to Figure 2, the solid dots in the five unit code shown at the left of this figure represent holes in the paper strip fed to the keyer, such corresponding to the marking or working elements of the code and being of negative polarity. In this description these marking elements are identified by x's. Conversely, the circles in Figure 2 represent the non-apertured portions of the paper tape, and constitute the spacing or rest elements of the codes, being of positive polarity. In this description, these spacing elements are identified by zeros.

Relays A—E are energized or not depending on the position of these working contacts I—V and they apply the correct voltages to conductors 1—7 with the aid of auxiliary relays F, G and H. Relays F and G have the function of giving two or one marking elements to the three groups, H is the K-combination relay. Contacts s control the transmission of a warning signal as indicated below in Fig. 2.

The operation of the circuit will now be considered in detail and it will be seen in the first place that, as a result of the different connection of contact I cooperating with relay A, as compared with contacts II—V cooperating with relays B—E, relay A is not excited when contact I is in its marking (i. e. its left hand) position. This circuit arrangement, in cooperation with the supply of voltage to tongue I from a point that may have positive or negative polarity (the latter only when one of the contacts II—V is in rest position) effects the conversion from mark to space of the first element of the five unit signal "letters." For this signal (i. e. "letters") relays B and C are operated, in order that conductors 2, 3 and 4 receive negative polarity through front contact $f_1$ and resistors R9, R10 and R11. No positive polarity can reach output terminals 2, 3 and 4 from front contact $f_2$ at this time because armatures $c_2$ and $b_3$ are on their front contacts. For relay F has been acted upon by way of front contacts $d_1$ and $e_1$.

The second group of three units in the signal "letters" receives positive voltage over the output terminals 5, 6 and 7 by way of back contact $g_2$ through resistors R12, R13 and R14, as armatures $d_3$, $d_4$ and $e_2$ are in the operated position. No negative polarity can reach output terminals 5, 6 and 7 from back contact $g_3$ at this time because armatures $e_2$ and $d_3$ are on their front contacts and armature $a_4$ is at normal. Thus the required seven unit signal is formed.

Relay A is acted upon for signals commencing with a space element. By way of illustration a signal having no K-combination is examined; these K-combinations are underlined in Fig. 2, one combination (indicating that the left hand two group in the five unit signal consists of marking elements) by a full line and the other K-combination (indicating that the right hand two group in the five unit signal consists of marking elements) by a broken line. If e. g. the transformation of the letter $h$ is examined, it will be seen that indeed the first unit becomes positive voltage, that relay B is at normal, relay C excited, relay D at normal and E excited. Relay G is excited by its second winding through front contact $a_2$ and by its operation switches the second group of three elements on operation with at least two marking elements, as it may easily be seen from the circuits. Relay F staying at normal, the first group operates with at most one marking element.

If the initial element is a marking element and one of the other four elements a space, marking voltage is applied to conductor 1 through the corresponding back contact and the front contact of I. The letter "a" is this type of signal because the initial element is a marking element, and at least one of the other four elements is a spacing element. I shall trace a complete character conversion of the letter "a" through the circuit of Figure 1 for the purpose of showing a complete conversion of one typical signal from the five unit code to the seven unit code. For this signal, contact fingers I and II will engage their left hand contacts, and contact fingers III, IV and V will engage their right hand contacts. Thus, the junction point to the left hand end of resistor R15 will have a negative polarity, and this will be transmitted to the first contact finger I. Relay B is the only relay of the series A—E that will be operated, and therefore auxiliary relays F, G and H will be at normal. The group of output terminals 2, 3 and 4 will receive positive polarity from back contact $f_1$, but output terminal 2 will receive negative polarity by way of back contact $f_2$, thence through back contact $c_2$, front contact $b_2$ (relay B now energized), and resistor R2. The group of output terminals 5, 6 and 7 will receive positive polarity by way of back contact $g_2$, and resistors R12, R13 and R14, respectively, but output terminal 7 will receive negative polarity by way of back contacts $g_3$, $h_2$, $e_2$, $d_4$ and resistor R7 (of lower value than resistor R14). This completes the conversion of the letter "a" from the five unit code to the seven unit code.

As explained above, the occurrence of two marking elements in a two element group will introduce a K-combination in the seven unit signal, if the first element is a space. As an example the letter $c$ will be examined.

Conductor 1 receives positive voltage in the way indicated above. Relays B, C and D are operated, E remains at normal. Both windings of relays G are energized, relay A also being operated; as the windings act in opposite sense, relay G remains at normal. Relays F and H are acted upon through front contact $a_3$. Consequently the remaining six units receive the correct polarity.

The other K-combination arises, for instance, in the case of letter $g$. In this case relay A is again excited, as well as B, D and E. Relay F is operated and applies spacing voltage (positive) to conductor 2 by means of front contact $f_2$, back contact $c_2$ and front contact $b_2$. Through contact $f_1$ marking voltage (negative) is applied to conductors 3 and 4. Conductors 5 and 6 receive also spacing voltage (positive) through contact $g_2$, and conductor 7 receives marking voltage (negative) by means of contact $g_3$, which is applied to the negative stud, back contact $h_2$, front contact $e_2$, front contact $d_3$, front contact $a_4$.

On its operation signalling relay S causes by its contacts $s_1$, $s_2$, and $s_3$ a signal to be given, as it will appear from the diagram.

Figure 3:
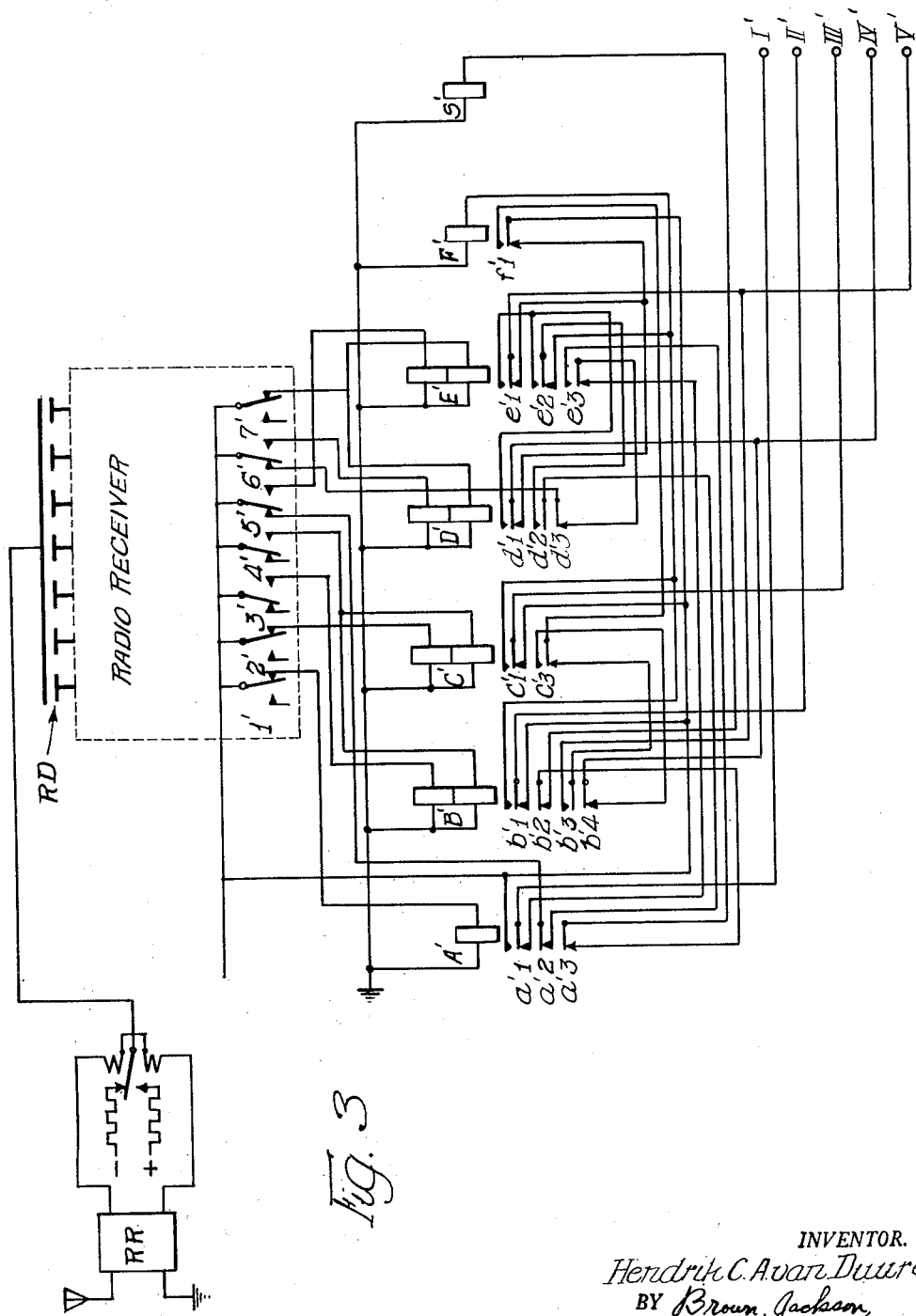

It will be understood that the seven unit signals are applied from the output terminals 1—7 of Figure 1 to the radio transmitter for transmission over the radio link of the system, and that at the receiving station these seven unit signals are applied from the radio receiver to the receiving converter, shown in Figure 3. The manner in which the seven unit signals are applied from the code converter output terminals 1—7 to the radio transmitter, and the manner in which the seven unit signals are applied from the radio receiver to the code converter of Figure 3, will be well understood by those skilled in the art. In my prior Patents Nos. 2,279,353 and 2,313,980 I have illustrated one typical arrangement for applying signals from a code converter to a radio transmitter, and for applying signals from a radio receiver to a code converter.

The receiver (Fig. 3) contains seven contacts 1—7 which are operated in accordance with the signal received. Relays A'—E' are energized conditionally on the circuits established. The windings of the double winding relays act in opposite sense.

It appears from the figure that, when applying the seven unit signals to contacts 1—7, the corresponding five unit signals are obtained on the segments I—V, relay S' being excited when the warning signal of the seven unit code is received. In tracing a reverse transformation through the receiver of Figure 3, it should be stated that the input members 1 to 7, inclusive, will respond to the radio receiver in such manner that they will engage their right hand contacts for a marking element and will engage their left hand contacts for a spacing element. Thus, referring particularly to the letter "a" which was described above in connection with the 5 unit to 7 unit conversion at the transmitter, I shall now describe the 7 unit to 5 unit reconversion thereof at the receiver shown in Figure 3. Since the first, second and seventh elements of the letter "a" in the seven unit code of Figure 2 are marking elements, it follows that input members 1', 2' and 7' of this receiver will engage their right hand contacts, while the other input members 3', 4', 5' and 6' will engage their left hand contacts, corresponding to spacing elements of the letter "a". Thus, relays A', C', D' and E' will be operated. Relay A' will be energized through the right hand contact of input member 1'; upper winding of relay C' will be energized through right hand contact of input member 2'; lower winding of relay D' will be energized through right hand contact of input member 7'; and, lower winding of relay E' will be energized through right hand contact of input member 7'. Relay F' will remain in an unenergized normal condition because its winding circuit is open-circuited at $e'_2$; is open-circuited at $b'_1$; and in passing through front contact $c'_1$ it merely extends to terminal III. Relay S' also remains in its normal de-energized condition because its winding circuit passing through contact $b'_2$ is open-circuited at $a'_3$. Hence, referring now to the potentials which are thus impressed upon the terminals or segments I'—V' of Figure 3, it will be seen that negative potential is impressed upon segment I' through front contacts $a'_1$ and thence to source of negative potential. Segment II' also receives a negative potential by way of the back contact $b'_1$ (relay B' now de-energized) and thence up to source of negative potential. Segment III' receives no potential because its connection through front contact $c'_1$ is open-circuited at the front contact $b'_1$, and at $e'_2$, and its connection through relay winding F' is merely to ground. Segment IV' receives no potential because its connection through contact $b'_4$, front contact $c'_3$ is open-circuited at $f'_1$; its connection through front contact $d'_1$, front contact $e'_2$, front contact $d'_2$ is open-circuited at back contact $a'_2$; and because its connection through front contact $d'_1$, front contact $e'_1$ is open-circuited at $b'_3$. Similarly, contact V' has no potential impressed thereon because its connection to front contact $b'_3$ is open-circuited at this point because of the de-energized condition of relay B'; because its connection through front contact $e'_1$, front contact $d'_1$, contact $d'_4$ and front contact $c'_3$ is open-circuited at front contact $f'_1$; and because its connection through front contact $e'_1$, front contact $e'_2$, front contact $d'_2$ is open-circuited at back contact $a'_2$. Hence, it will be seen that the signal obtained on these five terminal segments I'—V' consists of two negative voltage elements denoting marking elements impressed upon segments I' and II', followed by three no-voltage elements denoting spacing elements on segments III', IV' and V'. Thus, it will be seen that we again have the letter "a" reconverted to the five unit code.

In the transmitter as well as in the receiver the earth (ground connection) has the potential of the battery mid-point.

Equivalents of the described embodiment created by choosing different combinations will also come under the invention.

While I have illustrated and described what I regard to be the preferred embodiment of my invention, nevertheless it will be understood that such is merely exemplary and that numerous modifications and rearrangements may be made therein without departing from the essence of the invention.

I claim:

1. In apparatus of the class described, the combination of input terminals for receiving five-unit code signals having a variable ratio of marking and spacing elements, output terminals for transmitting seven-unit code signals having a fixed ratio of marking and spacing elements, a static converter comprising a series of electromagnetic relays having armature contacts responsive thereto and circuits controlled thereby operative to divide in effect each of the received five-unit code signals into three sections comprising one one-unit section and two two-unit sections and to convert such sections into seven-unit code signals each of which are also divided in effect into three sections comprising one one-unit section and two three-unit sections, said static converter comprising means for making the one-unit section of the seven-unit code responsive to the one-unit section of the five-unit code and for making the three-unit sections of the seven-unit code responsive to the two-unit sections of the five-unit code.

2. In apparatus of the class described, the combination of a code-converter for converting five-unit code signals into seven-unit code signals each having a fixed ratio of three marking elements and four spacing elements, said converter comprising relays which in effect divide each five-unit signal into a one-unit section and two two-unit sections, and which then convert said sections substantially into a one-unit section and two three-unit sections for making up a seven-unit code signal, said converter comprising means for introducing K-combinations into certain of those three-unit sections of the seven-unit code which correspond with certain two-unit sections of the five-unit code composed exclusively of marking elements, said K-combinations having a single marking element so that the resulting seven-unit code signal will not have more than a total of three marking elements.

3. In apparatus of the class described, the combination of input terminals for receiving input code signals composed of a fixed number of signal elements, output terminals for transmitting output code signals composed of a different fixed number of signal elements, and converter means therebetween operative to divide the signal elements of each input signal into groups and to convert such groups into other groups making up each output signal.

4. An apparatus as set forth in claim 3 in which said converter means is of the all-relay type comprising a series of electromagnetic relays having armature contacts responsive thereto and circuits controlled thereby operative in a simultaneous operation to effect said division of the elements of each input signal into groups and said conversion into other groups making up each output signal.

5. In apparatus of the class described, the combination of a code converter for converting input code signals each having a fixed number of signal elements, which may be marking elements or spacing elements, into output code signals each having a different fixed number of signal elements, said converter comprising relays which in effect divide each input signal into sections, and which then convert said sections into other sections for making up the corresponding output signal, said converter comprising means for introducing K-combinations into certain sections of the output signals which correspond with certain sections of the input signals composed exclusively of one type of signal element, said K-combinations having a single element of one type so that the resulting output signals will not have more than a predetermined number of such latter type of signal elements.

HENDRIK C. A. van DUUREN.

REFERENCES CITED

The following references are of record in the file of this patent:

UNITED STATES PATENTS

| Number | Name | Date |
| --- | --- | --- |
| 1,872,895 | Connery | Aug. 23, 1932 |
| 1,966,386 | Haglund | July 10, 1934 |
| 2,139,655 | Allensworth | Dec. 13, 1938 |
| 2,279,353 | Van Duuren | Apr. 14, 1942 |
| 2,309,222 | Spencer | Jan. 26, 1943 |